3,313,104
GAS TURBINE ENGINE
Duane E. Evans, Peoria, Ill., Thomas W. Head, Columbus, Ind., and Lloyd E. Johnson, East Peoria, and Peter W. Schutz, Peoria, Ill., assignors to Caterpillar Tractor Co., Peoria, Ill., a corporation of California
Filed Feb. 25, 1965, Ser. No. 435,311
1 Claim. (Cl. 60—39.16)

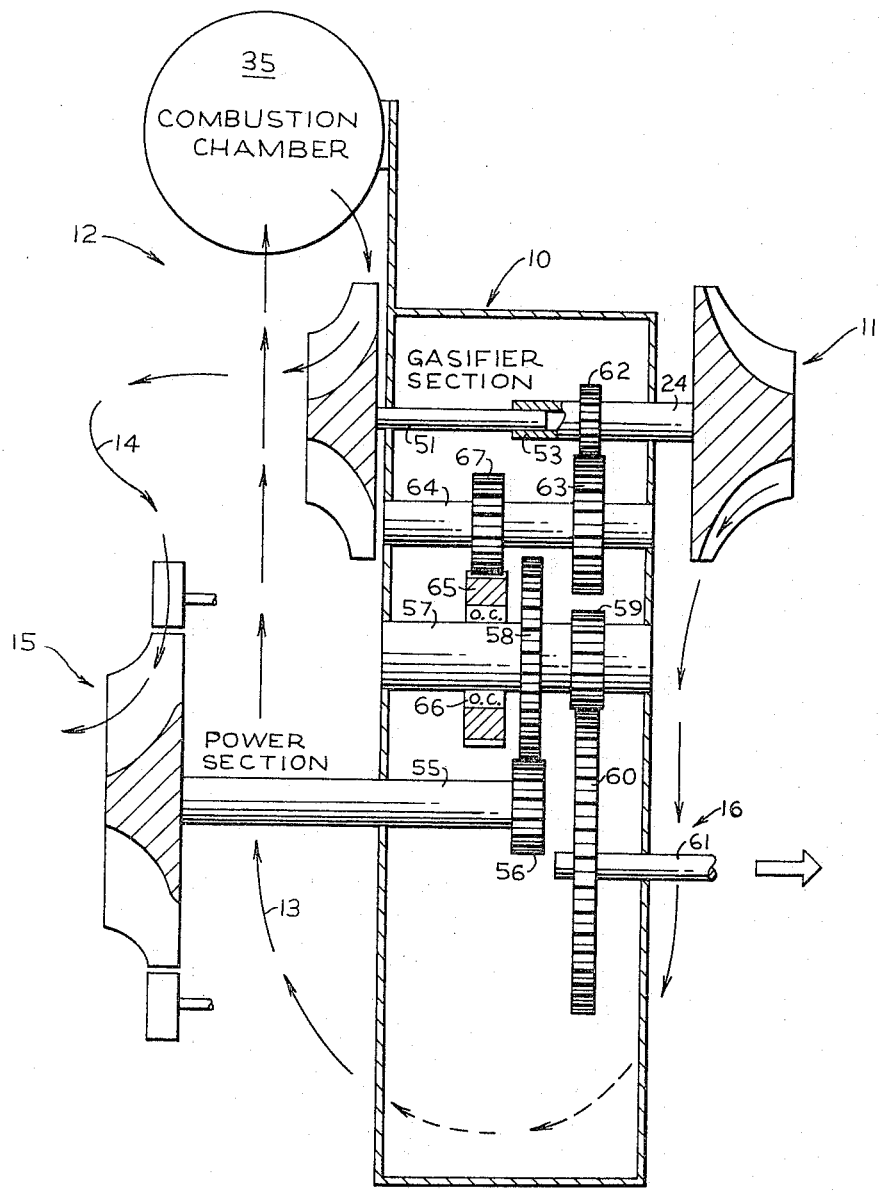

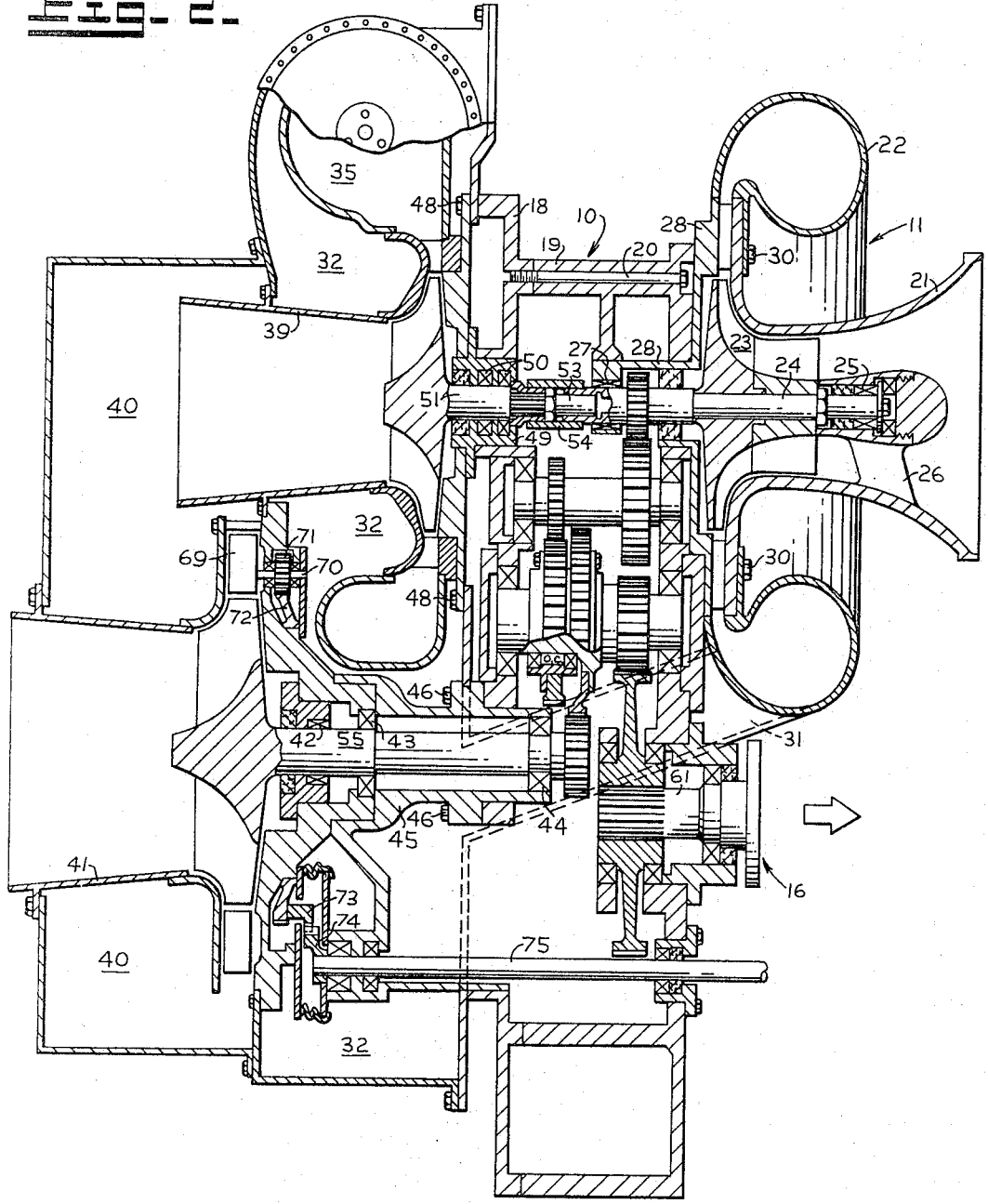

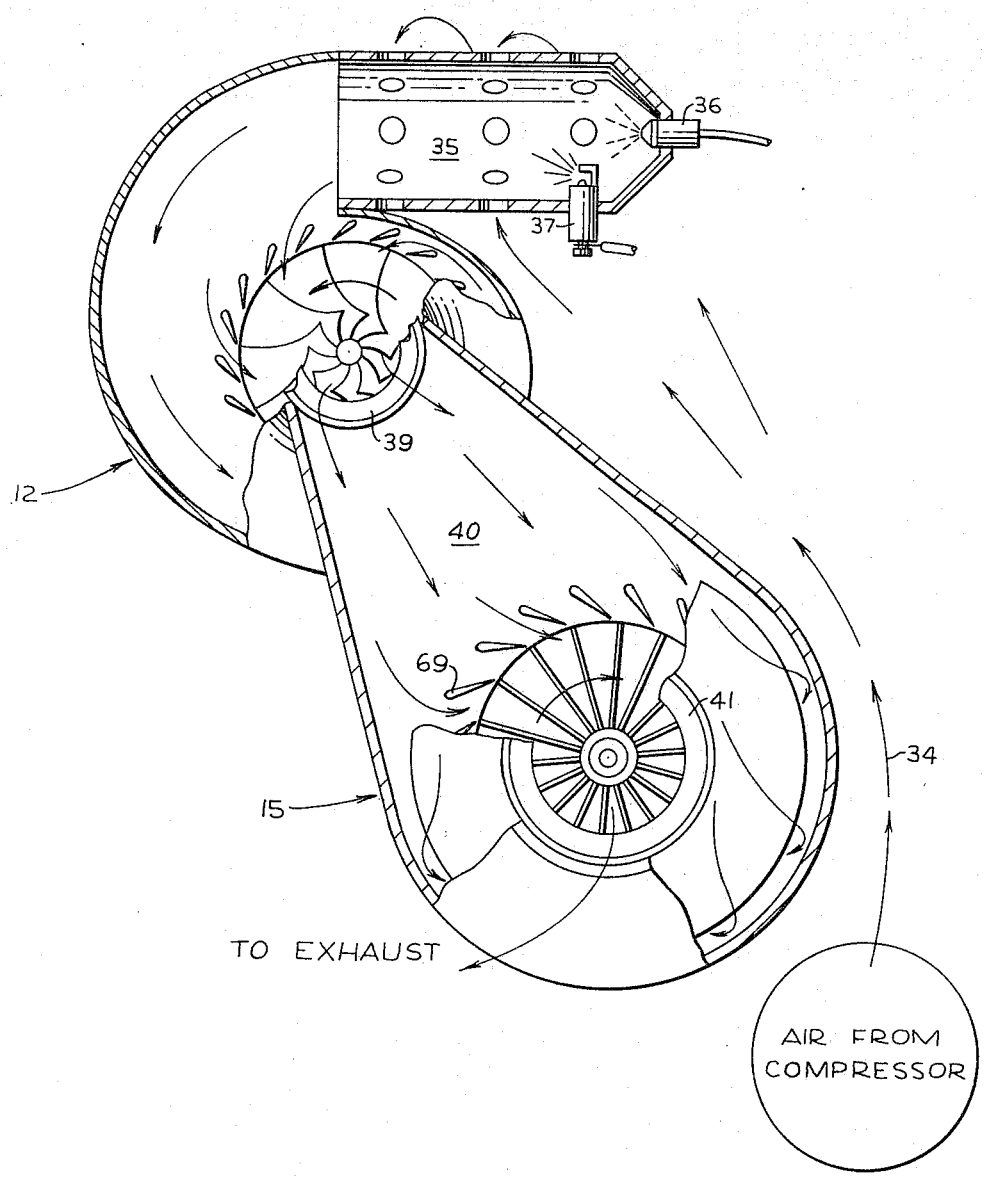

The present invention relates to gas turbine engines and particularly to improvements for adapting this type of engine to various heavy duty uses such, for example, as the prime power source on an earthmoving vehicle.

Conventional gas turbine engines lack many characteristics required for optimum service as the power plant in a large heavy duty vehicle.

It is an object of the present invention generally to improve upon gas turbine engines for heavy duty service by providing a durable and compact engine having as a main frame a more or less centrally disposed housing for power transmitting components and having various turbine units accessibly and removably supported by the housing.

Another object is to provide such an engine with an arrangement of components which enables a power output shaft to be disposed in a relatively cool location and in which relatively cool air from the compressor portion is directed into and through areas surrounding the hotter combustion chamber and compressor drive turbine and also around the power turbine.

Further and more specific objects and advantages of the invention are made apparent in the following specification wherein reference is made to the accompanying drawings.

In the drawings:

FIG. 1 is a schematic view in section of the principal components of a gas turbine engine embodying the present invention;

FIG. 2 is a sectional view similar to FIG. 1 but illustrating greater detail of the several components; and FIG. 3 is a schematic view in end elevation viewed from the left of FIG. 2 illustrating the relative positions of the combustion chamber compressor drive turbine and power turbine.

Referring first to FIG. 1, the engine of the present invention is shown as comprising a housing, generally indicated at 10, which contains a power gear train presently to be described and supports a compressor 11 on one side which directs air to a combustion chamber and compressor drive turbine, generally indicated at 12, the path of air being indicated by arrows 13 and the combustion chamber and compressor drive turbine being supported on the opposite side of the housing 10. Air from the compressor drive turbine is directed, as in the path of arrows 14, to a turbine 15 in the power section which is also supported on the combustion chamber or hot side of the housing and adapted through gearing to be presently described to transmit power through an output indicated at 16.

One of the desirable features of the present invention resides in the fact that the housing 10 not only encases the gear trains but serves as a rigid durable framework for the moving components of the engine. For example, as shown in FIG. 2, the housing is made of separable parts 18 and 19 secured together by a plurality of cap screws, one of which is shown at 20. The compressor 11, shown in FIG. 2 as having the usual intake throat 21 and collecting torus 22, includes a rotor 23 on a shaft 24. The shaft is supported at its outer end in bearings 25 in a central bearing housing carried by a spider 26. At its inner end bearings 27 are carried in an inwardly extended generally tubular part 28 integral with an annular plate 29 which supports and serves as a part of the compressor group. A circle of bolts, two of which are shown at 30, secure the entire compressor unit to the main housing 10 and upon removal of these bolts the entire compressor unit including its shaft and bearings is removable from the main housing 10 for service or repair.

During operation air from the compressor is transmitted through the collecting torus 22 and a transfer conduit shown in dotted lines at 31, through a large chamber 32 on the opposite side of the housing 10 which substantially envelopes the combustion chamber, compressor drive turbine and power turbine. Thus, air passing generally in the direction of arrows 34 in FIG. 3 enters the combustion chamber which is illustrated at 35 where it mixes with fuel from a nozzle 36 and is ignited by a plug such as indicated at 37. Expanded gases from the combustion chamber enter the rotor chamber of the compressor drive turbine and pass outwardly through its conical diffuser shown at 39 where they are collected by a chamber 40 and directed radially inwardly toward the rotor of the power turbine and thence outwardly through its diffuser 41 and are eventually exhausted to atmosphere.

Both the compressor drive turbine with the combustion chamber and the power turbine are supported by the housing 10 for convenient removal. The power turbine has bearings 42, 43 and 44 all supported in an inward extension 45 of the main body of the turbine and this extension is secured as by cap screws 46 to the housing 10. Consequently upon removal of the ducting which covers and surrounds the power turbine removal of the screws 46 permits its removal from the housing as a complete unit.

Removal of the compressor drive turbine is accomplished by removal of a circle of cap screws 48 in a part of the turbine housing which supports an inward extension 49 containing bearings 50 for a turbine shaft 51. The turbine shaft is aligned with and drives the shaft 24 of the compressor turbine but is readily removable independently of the compressor turbine shaft because of its connection thereto by a pilot as indicated at 53 and a splined sleeve 54 permitting ready endwise separation of the shafts. The essential gear trains are most clearly illustrated in FIG. 1 wherein the power turbine is shown as having a shaft 55 with a gear 56 driving a countershaft 57 through a gear 58 thereon and effecting reduced drive through a gear 59 on the countershaft and a gear 60 to the output shaft 61 of output 16. The compressor drive turbine drives the compressor 11 directly through the splined connection heretofore described and the shaft 24 of the compressor carries a gear 62 meshing with gear 63 to drive a second countershaft 64. Countershaft 64 and countershaft 57 are connected by a gear 65 having a one-way or overrunning clutch connection 66 with the countershaft 57 and a gear 67 on the countershaft 64. The direction of drive through the overrunning clutch is such that the compressor drive turbine will not normally impart driving movement to the countershaft 57 or to the output which is driven thereby. However, should the output shaft speed exceed a predetermined ratio with respect to that of turbine shaft 51, as occurs in a vehicle operating on a downhill grade, the output shaft will be retarded because of the driving connection through the overrunning clutch and associated gear train. Retarding of vehicle speed through the engine is also made possible by the use of variable turbine nozzle vanes in the power turbine. Such vanes, as shown at 69 in FIG. 2, are mounted on rotatably adjustable shafts 70 which also carry gear segments 71 meshing with a ring gear 72. An arcuate gear segment 73 is also secured to ring gear 72 and meshes with another segment 74 which is fixed to and angularly adjustable by a control rod 75 all in more or less conventional fashion. Reversal of the nozzle vanes 69 through the mechanism disclosed imparts a retarding effect to the rotor of the power turbine and can cause the power turbine to rotate in a reverse direction.

We claim:

A gas turbine engine having a main supporting frame in the form of a housing, a gear transmission means enclosed in said housing, a compressor and compressor drive turbine on opposite outer sides of said housing and operatively connected by shaft means extending through the housing, a power turbine on the same outer side of said housing as the compressor drive turbine and being offset laterally therefrom, an output connection on the same outer side of said housing as the compressor and being laterally offset in the same direction as the offset of said power turbine, said compressor, compressor drive turbine, power turbine and output connection each having individual shaft means and gear means, said individual gear means meshing with the gear transmission means when assembled and each being in the form of separable units detachably connected to the housing to facilitate removal therefrom, service and repair.

References Cited by the Examiner

UNITED STATES PATENTS

| 2,400,622 | 5/1946 | Althoff | 60—54 |
| 2,479,573 | 8/1949 | Howard | 60—39.66 X |
| 2,619,797 | 12/1952 | Haworth | 60—39.16 |
| 2,730,863 | 1/1956 | Price | 60—39.15 |
| 3,037,347 | 6/1962 | Leibach | 60—39.16 |
| 3,181,295 | 5/1965 | Pauwels et al. | 60—39.16 |

JULIUS E. WEST, *Primary Examiner.*